April 10, 1945. A. H. ROSENTHAL Re. 22,628
TELEVISION RECEIVER
Original Filed March 11, 1939
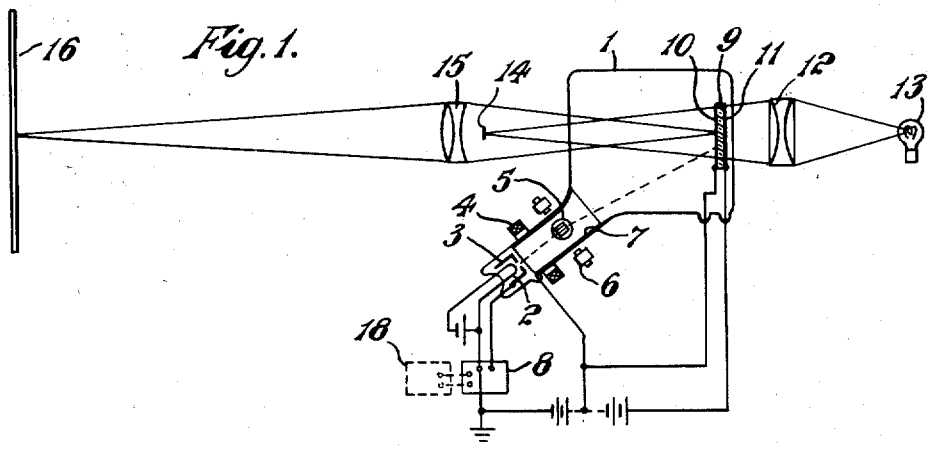
Fig. 2.
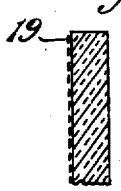
Inventor
Adolf H. Rosenthal
By Lenstowne, Darby, Lenstowne
Attys.

Reissued Apr. 10, 1945

Re. 22,628

UNITED STATES PATENT OFFICE 22,628

TELEVISION RECEIVER

Adolph Henry Rosenthal, New York, N. Y., assignor, by mesne assignments, to Scophony Corporation of America, New York, N. Y., a corporation of Delaware Original No. 2,306,407, dated December 29, 1942, Serial No. 261,331, March 11, 1939. Application for reissue December 27, 1944, Serial No. 570,489. In Great Britain March 18, 1938

7 Claims. (Cl. 178—7.5)

The present invention relates to television or like receivers, and is a continuation in part of my copending application Serial No. 253,182, filed January 27, 1939, now Patent 2,330,171, which is concerned with a novel image screen for such a receiver. By the term image screen is meant a screen, the optical properties of which change from point to point in accordance with received signals to be reproduced so that such a screen can be imaged with the aid of light from an external source on to a projection screen to give a representation of the information reproduced in the image screen.

If certain crystals, which are normally transparent to visible light, are struck by a beam of cathode rays, the electron charge thus injected into the crystal creates therein what will hereinafter and in the appended claims be referred to as "opacity centers," and which can constitute an opaque deposit the degree of density of which depends on the intensity of the incident charge. Examples of such crystals are many of the alkali and alkaline earth halides, such as the chlorides, bromides and iodides of sodium and potassium, lithium bromide, calcium fluoride, and strontium fluoride and chloride; and also certain silver salts such as silver bromide. All these materials belong to the class of the so-called "ionic crystals," i. e. crystals in which there are positive and negative components, and the forces that hold them together are electrostatic, at least in part. In the case of the alkali halide crystals research has indicated that the opacity centers probably consist of neutral alkali atoms comprised of positive and negative charges which are loosely bound in the interior of the crystals in some manner or other, and which can be compared with the deposit of metallic silver in a latent photographic image.

Once formed, the opaque deposit can also be destroyed by the above mentioned rays, the amount of destruction in a given time interval depending on the intensity of the rays and on the density of the deposit already formed. Thus the gross effect of any given intensity of the incident radiation, being the result of an equilibrium between the formation and destruction of the deposit, may be for instance an increase of the deposit for lower intensities and a decrease for the higher intensities, in a manner similar to the well known "Solarisation" of the latent photographic image. In this case, over a range of lower intensities of the incident radiation, increase in intensity will result in an increase of the deposit, whilst over a range of higher intensities an increase in intensity will result in a decrease of the deposit.

The materials exhibiting this property may be defined as those of the ionic type in which the injection of electrons into the crystal lattice can give rise to an opaque deposit in said lattice, constituted by opacity centers.

In my patent referred to above there is contemplated the use of a transparent crystalline material of the type defined in the image screen of a television or like receiver. The material may be in the form of a single flat crystal, a mosaic of small crystals, or a micro-crystalline structure. A composite crystal (crystalline solid solution) or a mixture of two or more of such crystalline materials may be used.

In most cases, and particularly when the material is in the form of a single crystal, a disappearance of the opaque deposit can be produced by maintaining the crystal in an electric field and at a suitable temperature, in which case the deposit is drawn through the crystal towards the positive pole producing the electric field. When it reaches the positive pole it disappears, leaving the crystal substantially transparent. The speed of movement of the deposit depends upon the strength of the field and upon the temperature, and can be varied within wide limits by varying either magnitude. For a given field strength this speed of movement increases with the temperature of the crystal.

In the various embodiments described in my patent referred to above, conditions are such that the opaque deposit in the image screen constitutes in itself a visible image or reproduction of intelligence, and consequently this image can be directly projected on to a projection screen.

The formation of opacity centres in any given elemental area of the screen is accompanied by a corresponding change in the refractive index of this area, with respect to the refractive index of the remaining areas, due to the temporary liberation of electrons and the presence of free or loosely bound electrons in the substance of the screen. Instead of, or in addition to, the changes in opacity of the screen these changes in refractive index can be utilized to produce a visible image, and it is an object of the present invention to provide means whereby this utilization of the changes of refractive index can be achieved.

According to the present invention a television or the like receiver comprises a screen of a material of the type defined, means for scanning the screen with a cathode ray beam modulated in intensity in accordance with the received signals to produce a change in the refractive index of the material of each elemental area in turn, the degree of change depending upon the instantaneous intensity of the beam striking the area, means for illuminating said screen, optical means for separating the portion of the light which undergoes a change of direction due to said change in refractive index from the remaining portion, and means for directing one of said portions on to a projection screen.

The chief advantage of the present invention is that where the conditions are such that the density or tint of the opaque deposit are not suitable for the production of a satisfactory visible picture on the viewing screen, the method of the present invention can be used to overcome this difficulty.

The invention will now be described by way of example with reference to the accompanying drawing in which Fig. 1 shows schematically one form of the invention, and Fig. 2 shows an alternative form of construction of the image screen.

Referring to Fig. 1, a cathode ray tube 1 is provided with a cathode 2, a control grid 3, a beam focussing coil 4, deflecting coils 5, 6 and an accelerating anode 7. Picture or other signals representative of intelligence intercepted by the receiver 8 are applied between the cathode and control grid in such a way that the positive potential of the grid decreases with increase in signal strength, so that a modulated beam is produced and is swept over the image screen in the usual manner. The image screen consists for instance of a flat crystal 9 of an alkali halide such as potassium chloride, provided on each side with an electrode 10, 11 designed to permit the passage of light. These electrodes are shown in the form of thin transparent sputtered metallic layers, but they can also be in the form of fine meshes or the like. The potential of the electrode 11 is maintained positive with respect to that of the electrode 10 to provide an electric field in the crystal.

As explained in detail in my patent referred to above a fugitive image in the form of opaque deposits is produced in the crystal 9 which travel through the crystal and disappear at the electrode 11, and normally it is possible to project this image directly on to a viewing screen. The formation of this image in the crystal screen is accompanied by a corresponding change in the refractive index of the crystal, this change, for any given elemental area of the crystal depending upon the intensity of the cathode ray beam when it strikes the area.

According to the present invention, this change in the refractive index is utilized in forming a visible image on a viewing or projection screen. In Fig. 1 the so-called Töpler-Schlieren method is used for this purpose, and to this end the condenser lens system 12 forms an image of the light source 13 on the opaque bar 14, so that in the absence of any changes in the refractive index of the crystal 9, no light proceeding from the crystal can pass the bar 14.

If now a change in the refractive index, and hence a change in the optical path through the material forming a given elemental area of the crystal is produced, the light rays passing through this area will experience a change of direction, so that some of the light will pass the bar 14. This light is utilized by the projection lens 15 to form an image of the crystal on the projection screen 16.

In order to obtain a satisfactory picture on the projection screen 16 it is necessary that the quantity of light proceeding from a given elemental area of the crystal which passes the bar 14 should be substantially proportional to the intensity of the radiant energy producing the change in the optical path in the elemental area, since it is this quantity of light which determines the intensity of the corresponding elemental area of the picture on the screen 16. Now this quantity of light is not proportional to the optical path through the elemental area under consideration but is proportional to the first differential of this, i. e. if $y$ represents the geometrical path through the crystal (if the light is incident normally on the crystal $y$ will represent the thickness of the crystal), if $n$ represents the refractive index of the material of the elemental area, and if $x$ represents any linear dimension of the area in the plane of the crystal, then $yn$ gives the optical path and the quantity of light passing the bar 14 is proportional to $$\frac{d(yn)}{dx}$$

This latter expression will be hereinafter and in the appended claims referred to as the gradient of the optical path.

This gradient along the screen surface in the optical path through each elemental area of the screen may be produced by modulating the intensity of the scanning beam with high frequency oscillations derived from the source 18, the frequency of these oscillations being in the neighbourhood of element frequency, so that there is produced a gradient in the refractive index of the crystal in the line scanning direction over each elemental area, and hence a gradient in the optical path. This gradient is then altered by the signal modulations superimposed on the high frequency modulations. This effect can also be produced by using an unmodulated beam (except for the signal modulations) and interposing a fine metallic grating (19, Fig. 21) at or near the scanned surface of the crystal, or such a grating may be in the form of a partly transparent metallic deposit on the crystal surface and acting at the same time as one of the crystal electrodes.

Alternative methods of producing the desired changes in refractive index in the image screen can be employed. These methods are substantially identical with the various alternative methods of producing the opaque deposit in the screen which are described in detail in my patent referred to above, and need not be described in the present specification.

I claim as my invention:

1. A receiver for electric signals representative of intelligence, such as television signals, including a cathode ray tube, a transparent screen in said tube substantially of ionic crystal material of the type in which the injection of electrons comprised by a beam developed in said tube can create opacity centers and a local change of its refractive index depending on the intensity of said beam, means for modulating the beam in accordance with signals to be reproduced and for causing it to scan said screen, a light source for causing light to pass through said screen, an optical stop on the side of said screen remote from said light source, an optical system adapted to form an image of said light source on said stop, and optical means for utilizing light which by-passes said stop due to said effect of said scanning beam, to form an image of said tube screen on a projection screen.

2. A receiver for electric signals representative of intelligence, such as television signals, including a cathode ray tube, a transparent screen in said tube substantially of ionic crystal material of the type in which the injection of electrons comprised by a beam developed in said tube can give rise to opacity centers and to a local change of its refractive index depending on the intensity of said beam, a grating associated with said screen, means for modulating the intensity of said beam in accordance with signals to be reproduced and for causing it to scan said screen, a light source for causing light to pass through said screen, an optical stop on the side of said screen remote from said light source, an optical system adapted to form an image of said light source on said stop, and optical means for utilizing light which by-passes said stop due to the combined effects of said grating and scanning beam, to form an image of said tube screen on a projection screen.

3. A television or like receiver as claimed in claim 2 wherein said grating is in the form of a partly transparent metallic deposit on said screen.

4. A receiver for electric signals representative of intelligence, such as television signals, including a cathode ray tube, a transparent screen in said tube substantially of ionic crystal material of the type in which the injection of electrons comprised by a beam developed in said tube can give rise to opacity centers and to a local change of its refractive index depending on the intensity of said beam, a source of high frequency oscillations, means for modulating the intensity of said beam in accordance with said high frequency oscillations from said source and with signals to be reproduced, means for causing said beam to scan said screen, a light source for causing light to pass through said screen, an optical stop on the side of said screen remote from said light source, an optical system adapted to form an image of said light source on said stop, and optical means for utilizing light which by-passes said stop due to said effect of said modulated scanning beam, to form an image of said tube screen on a projection screen.

5. In a receiver for electric signals representative of intelligence, such as television signals, the combination including a transparent screen substantially of ionic crystal material of the type in which the injection of electrons can create opacity centers and a local change of its refractive index depending on the intensity of the injected electron charge, means for developing a cathode ray beam and directing it upon elemental areas of said screen, a source of high frequency oscillations, means for modulating the intensity of said beam in accordance with received signals to be reproduced and with said oscillations, so that said beam produces in each impinged elemental screen area a gradient of the optical path therethrough the value of which depends on the combined modulation effects of said oscillations and signals upon the intensity of said beam, a light source for causing light to pass through said screen, an optical stop on the side of said screen remote from said light source, an optical system adapted to form an image of said light source on said stop, and optical means for utilising light which by-passes said stop due to and in its quantity depending substantially on said gradient, to form an image of said tube screen on a projection screen.

6. A receiver for electric signals representative of intelligence, such as television signals, including in combination, a transparent screen substantially of ionic crystal material of the type in which the injection of electrons can create opacity centers and a local change of its refractive index depending on the intensity of the injected electron charge, means for developing a cathode ray beam and directing it upon elemental areas of said screen, a source of high frequency oscillations, means for modulating said oscillations with received signals to be reproduced, means for modulating the intensity of said beam with said modulated oscillations so that said beam produces in each impinged elemental screen area a gradient in the optical path therethrough corresponding to said high frequency modulations and altered by said signal modulations, a light source for causing light to pass through said screen, an optical stop on the side of said screen remote from said light source, an optical system adapted to form an image of said light source on said stop, and optical means for utilising light which by-passes said stop due to and in its quantity substantially depending on said gradient, to form an image of said tube screen on a projection screen.

7. A receiver for electric signals representative of intelligence, such as television signals, including a cathode ray tube, a transparent screen in said tube substantially of ionic crystal material of the type in which the injection of electrons comprised by a beam developed in said tube can create opacity centers and a local change of its refractive index depending on the intensity of said beam, means for causing said beam to impinge elemental screen areas, a grating associated with said screen and arranged in the path of said beam for causing the latter to produce a gradient in the optical path through each impinged elemental screen area, means for modulating the intensity of said beam and thereby alter said gradient in accordance with signals to be reproduced, a light source for causing light to pass through said screen, an optical stop on the side of said screen remote from said light source, an optical system adapted to form an image of said light source on said stop, and optical means for utilising light which by-passes said stop due to the combined effects of said grating and beam and substantially depending in its quantity on said gradient, to form an image of the tube screen on a projection screen.

ADOLPH HENRY ROSENTHAL.

CERTIFICATE OF CORRECTION.

Reissue No. 22,628. April 10, 1945.

ADOLPH HENRY ROSENTHAL.

It is hereby certified that error appears in the above numbered patent requiring correction as follows: In the drawing, Figure 2 as shown below should be added as a part of the patent -

Fig. 2.

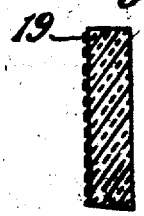

page 2, second column, line 48, for "Fig. 21" read --Fig. 2--; and that the said Letters Patent should be read with this correction therein that the same may conform to the record of the case in the Patent Office.

Signed and sealed this 3rd day of July, A. D. 1945.

Leslie Frazer (Seal) Acting Commissioner of Patents.